Aug. 7, 1951    R. McFARLAN    2,563,180
STRAINER SCOOP
Filed Jan. 28, 1948
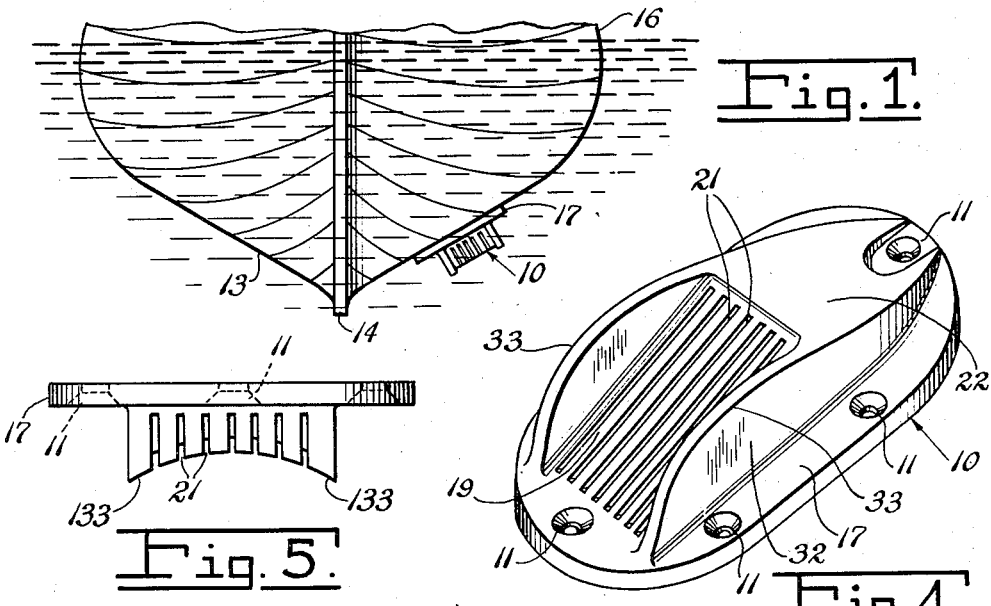
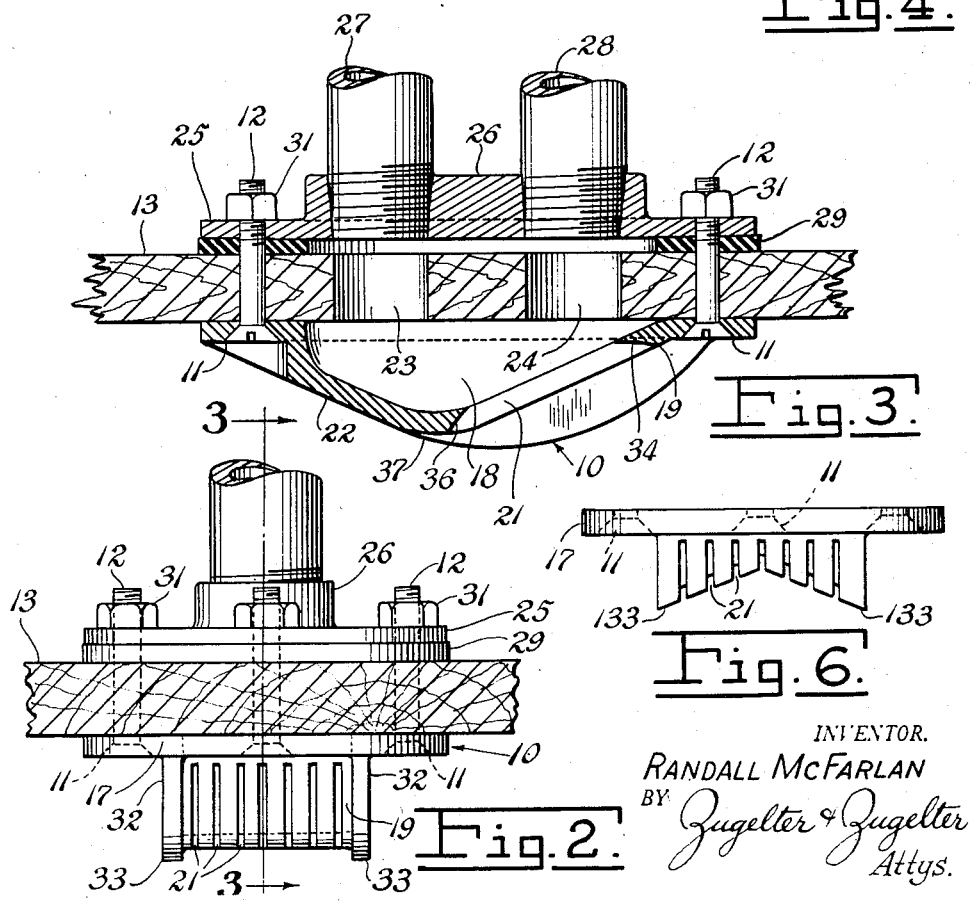
INVENTOR.
RANDALL McFARLAN
BY Zugelter & Zugelter
Attys.

Patented Aug. 7, 1951

2,563,180

UNITED STATES PATENT OFFICE 2,563,180

STRAINER-SCOOP

Randall McFarlan, New Richmond, Ohio

Application January 28, 1948, Serial No. 4,853

2 Claims. (Cl. 114—221)

This invention relates to a water scoop or intake for use on motor boats and other vessels. More particularly, this invention relates to a combined strainer and scoop for collecting water for use in cooling a boat engine and for the plumbing of a boat.

A principal object of the present invention has been to provide a combined strainer and water scoop which is self-cleaning due to the action of water passing over the strainer-scoop.

A further object of the present invention has been to provide a strainer-scoop which is constructed to prevent damage to the strainer section from floating and submerged objects.

A further object of the present invention has been to provide a strainer-scoop which requires no additional strainer element in order to separate foreign material from water collected by the strainer-scoop.

The foregoing and other objects are attained by the means described herein and illustrated in the accompanying drawing, in which:

Figure 1 is a schematic view showing the lower part of a hull of a motor boat or other vessel to which is attached a strainer-scoop constructed in accordance with this invention.

Figure 2 is an enlarged front view in elevation showing the strainer-scoop illustrated in Figure 1, the scoop being shown attached to the hull, the hull being shown in cross-section.

Figure 3 is a sectional view taken along the line 3—3 in Figure 2.

Figure 4 is an enlarged perspective view of the strainer-scoop.

Figures 5 and 6 are end views similar to Figure 2, showing two modifications of the device.

In the past, scoops for collecting water for use in cooling engines and for use in plumbing and other apparatus of boats have ordinarily been in the form of open pipes, or pipes covered with coarse grating. If there is any danger of foreign matter such as floating twigs, branches, debris, or the like in the water, these scoops must be provided with auxiliary screens to catch the foreign matter before it can enter and stop up the cooling jacket of an engine or the plumbing or other apparatus of the boat. Such a screen or strainer, of necessity, must be located within a pipe at an inconvenient point where difficult to reach and clean.

Briefly, the present invention provides a strainer element which forms a part of the scoop. The scoop is provided with a forward surface in which a series of elongated slots running lengthwise of the boat are cut. Water enters the scoop and is strained through these openings. Ribs on opposite sides of and parallel to the slots channel the water as it flows past the slots so that the water flows parallel to the slots and can enter them. The strainer section is substantially self-cleaning, for the rapid flow of water along the straining surface and parallel to the slots sweeps the slots clear. The ribs not only act to channel water along the slots for increasing the speed and pressure of the water passing along the slots to sweep them clean but also serve as protective walls absorbing the shock incident to contact with foreign objects in the water to protect the strainer surface.

As illustrated in the drawing, a strainer-scoop 10 is made from a brass, bronze, or other appropriate casting. The scoop has peripheral openings 11 through which bolts 12 pass to attach the scoop to a hull 13 of a boat. The scoop is attached to a side of the hull 13 at a point intermediate a keel 14 and freeboard 16.

The scoop 10 has a peripheral edge 17 which fits against the hull 13 in which the openings 11 are formed. Inside the peripheral edge 17 the scoop is raised away from the hull to form an open concave section or chamber 18. A forward wall 19 of the chamber 18 is in the form of a plane which slopes upwardly toward the hull 13. A series of elongated slots 21 cut in the wall 19, which slots run lengthwise of the hull 13, permit water to enter the chamber 18. A rear wall 22 of the chamber 18 curves upwardly from the wall 19 to the hull 13 to direct water from the chamber in the direction of the hull. Two openings 23 and 24 through the hull 13 communicate with the chamber 18. On the inside of the hull 13 a pipe plate 25 having an enlarged central portion 26 and two pipes 27 and 28 communicate with the openings 23 and 24. The pipes 27 and 28 are threaded to the enlarged central portion 26 and may be connected to the engine cooling system, the plumbing, and any other apparatus of the boat requiring water. A gasket 29 separates the hull 13 and plate 25 and the plate 25 is held against the gasket 29 by the bolts 12 and nuts 31 tightened on the bolts 12.

Side walls 32 of the chamber 18 have projecting ribs 33 which project beyond the slotted wall 19. The ribs 33 are located on opposite sides of and parallel to the slots 21 and channel the water along the slots parallel to them so that the water enters the slots and does not flow across them. The ribs 33 constrict the water as it flows along the slots 21 and increase its speed causing the water to flow lengthwise of the slots to sweep the slots clean. Moreover, the ribs 33 protect the slots and ward off from the slots any large floating or submerged objects.

The long narrow slots 21 serve to strain out and prevent entry into the chamber 18 of all but the smallest foreign matter while permitting an adequate flow of water. Fabrication of the strainer scoop is simple, for it can be made from a casting in which the slots 21 can be sawed by a circular saw to give a substantially horizontal arcuate forward edge 34 near the peripheral edge 17 as shown in Figure 3 and an angled arcuate rear edge 36 near an apex 37 of the chamber 18 on each slot. Sawed slots are preferred, for when formed by a saw, each slot has sharp square edges and parallel opposite lengthwise sides which permit the flow of water but catch a greater proportion of the foreign matter which reaches the slots than would a simple grating. As the hull 13 moves through the water, the slots face forward and water is forced through the slots to enter the chamber 18 under pressure, while any foreign matter is strained out by the slots 21 or directed aside by the ribs 33.

In the modified form of the device as illustrated by Figure 5, the desired protection for the slotted forward wall 19 is provided by making the wall concave in cross-section, as shown. This construction results in the formation of a channel bounded by the outer extending side wall sections 133—133, which define the limits of the channel to direct a strong and swift flow of water lengthwise of the slots, the performance here being the same as was explained in connection with the ribbed structure of Figure 2. The concave structure of Figure 5 is subject to modification, for example, as illustrated by Figure 6 wherein the channel is of inverted V-shape in cross-section. These and substantially equivalent modifications assure the same type of performance and advantage, as characterize the ribbed device of Figures 1 to 4, inclusive.

It is to be understood that the device may be a casting or a stamping of any appropriate material, and that various modifications and changes in structural details may be resorted to, within the scope of the appended claims, without departing from the spirit of the invention.

Having described my invention, I claim:

1. An intake water strainer-scoop for a boat which comprises an inner slotted portion provided with a plurality of narrow, parallel, closely spaced slots, a peripheral rim surrounding the slotted portion and adapted to be attached to the hull of the boat with the slots extending lengthwise and inclined downwardly and rearwardly of the path of travel of the boat, the slotted portion being angularly disposed relative to the rim and adapted to extend away from the hull of the boat with the forward end of the slotted portion closer to the rim than the rear end of the slotted portion, and a pair of ribs parallel to the slots and spaced on opposite sides of the slotted portion between the slotted portion and the rim, the ribs extending below the rim and slotted portion and forwardly of the slotted portion and in the same direction as the slotted portion to confine the flow of water and establish a directional flow parallel to the slots when the strainer-scoop is in motion to render the slots self-cleaning.

2. A water intake and strainer scoop having a rim adapted to be secured to the bottom of a boat, and a scoop cavity and strainer portion within the rim, the cavity being open on the boat bottom side thereof, said scoop and strainer portion being substantially V-shape in longitudinal section and extending downwardly from the rim and boat bottom, the portion forward of the apex of the V sloping upwardly and forwardly to the forward end of said rim and the portion to the rear of said apex sloping upwardly and rearwardly to the rear end of said rim, the forward upwardly sloping portion including a plurality of closely spaced parallel slots, and a channeling rib on each side of said slotted portion in parallel relation thereto, said channeling ribs extending forwardly of and below the slotted portion and in the same direction as the slots to confine and direct the flow of water through said slots into said cavity.

RANDALL McFARLAN.

REFERENCES CITED

The following references are of record in the file of this patent:

UNITED STATES PATENTS

| Number | Name | Date |
| --- | --- | --- |
| 835,854 | Franquist | Nov. 13, 1906 |
| 1,641,670 | French | Sept. 6, 1927 |
| 2,281,459 | Scott-Paine | Apr. 28, 1942 |
| 2,397,678 | Minkler | Apr. 2, 1946 |
| 2,456,834 | Napoli | Dec. 21, 1948 |
| 2,462,118 | Minkler | Feb. 22, 1949 |